Dec. 28, 1954

C. M. BLAIR, JR., ET AL 2,698,303

PROCESS FOR TREATING EMULSIONS

Filed Feb. 18, 1952

INVENTORS.
CHARLES M. BLAIR, JR.
SEARS LEHMANN, JR.
GILBERT J. SAMUELSON
BY THEIR ATTORNEYS.
HARRIS, KIECH, FOSTER & HARRIS

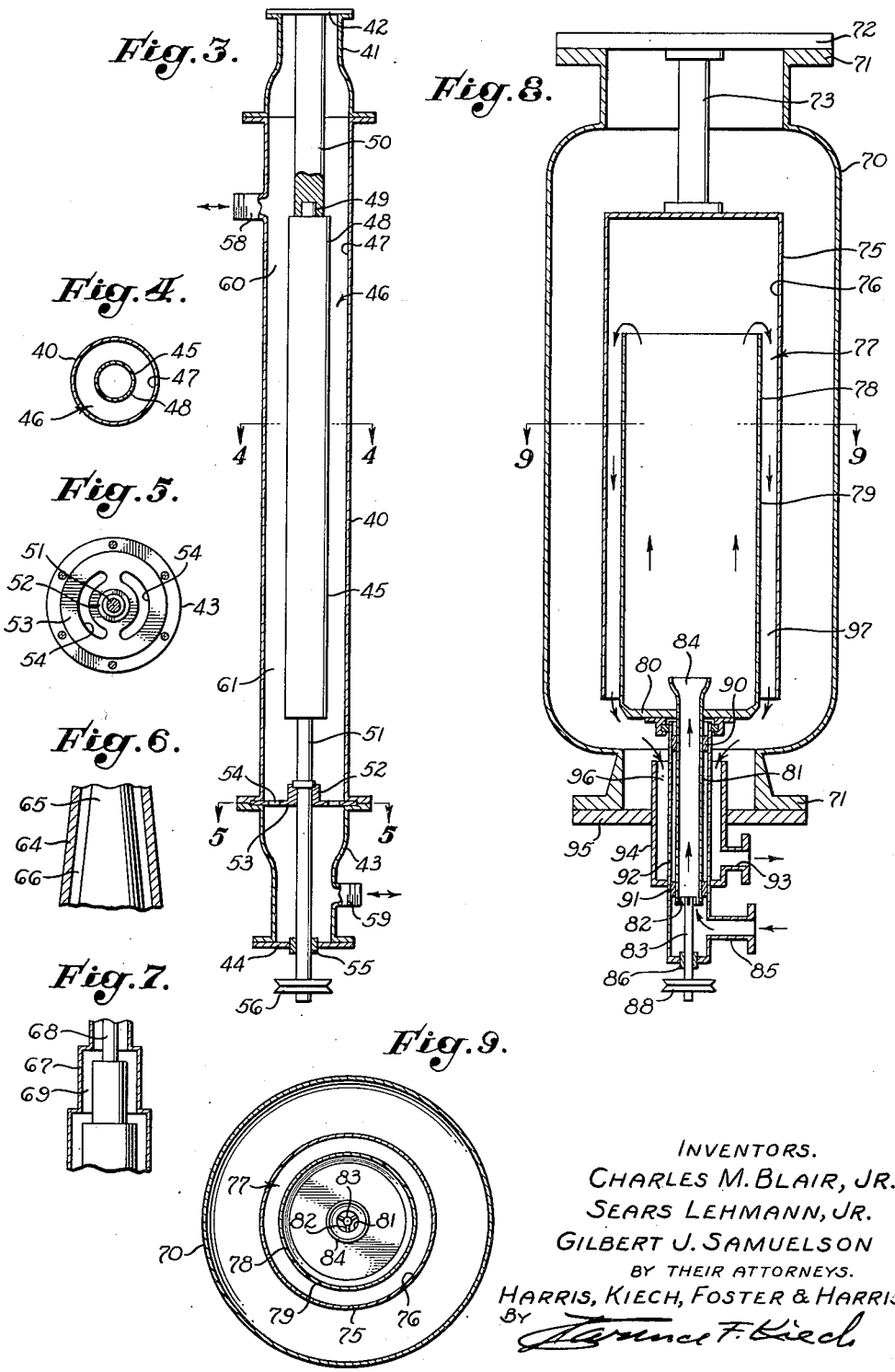

United States Patent Office 2,698,303
Patented Dec. 28, 1954

2,698,303

PROCESS FOR TREATING EMULSIONS

Charles M. Blair, Jr., Webster Groves, Sears Lehmann, Jr., University City, and Gilbert J. Samuelson, Webster Groves, Mo., assignors to Petrolite Corporation, Wilmington, Del., a corporation of Delaware Application February 18, 1952, Serial No. 272,164

12 Claims. (Cl. 252—349)

This invention relates to the treatment of emulsions and more particularly to the resolution of emulsions in which the external phase is an oil and the dispersed phase is a liquid or semi-liquid sufficiently immiscible with the oil to exist therein in the form of dispersed droplets. The oil phase of such an emulsion may be any vegetable, animal or mineral oil, or products obtained therefrom. The invention will be exemplified with reference to petroleum emulsions in which the external phase is crude oil or distillation products derived therefrom and whether or not containing a solvent or diluent. The internal or dispersed phase may be any liquid sufficiently immiscible with the external-phase material to exist therein as dispersed droplets. By way of example, the invention will be specifically described with reference to the dehydration or desalting of crude oil emulsions of the water-in-oil type in which the dispersed phase is an aqueous medium, typically droplets of relatively fresh water or brine or both, the term "water" being used in the broad sense to cover these or other aqueous media.

Crude oil emulsions are commonly produced by oil wells due to the mixture of water with the oil entering the well, such emulsions being often referred to as "natural" emulsions. They must necessarily be broken and the water separated therefrom before the oil is suitable for further processing by the conventional refining methods. Our process is applicable to such "natural" emulsions, and it is an object of this invention to provide a process for effectively resolving such emulsions and other emulsions of the oil-continuous type which will not readily separate on standing.

Many of the waters which are found in these "natural" emulsions have high salt contents and are often called "brines" for that reason. The commercial dehydrating procedures usually are unable to remove every trace of such brines, producing so-called pipe-line oils containing from a fraction of a per cent up to no more than a few per cent of residual brine. However, this residual brine carries an objectionable amount of corrosive and otherwise deleterious salts, harmful to the refining steps and to the products resulting therefrom.

To reduce the quantity of such salts, the pipe-line oil is often subjected, usually at the refinery, to a desalting operation in which relatively fresh water is mixed with the oil to combine with the residual brine at some stage in the process, the aqueous material being then separated to leave a desalted oil. Emulsions thus made for desalting purposes are referred to as "artificial" emulsions and our process is applicable to them. It is an object of this invention to provide a process for efficiently removing the salt from a pipe-line oil or refinery charging stock before subjection to refinery processing.

Due to the stabilizing agents present in crude oils, both the "natural" and "artificial" emulsions are usually so stable that they cannot be resolved effectively at reasonable temperatures except by use of auxiliary equipment or chemicals. The present invention is concerned, in one of its important aspects, with the treatment of such emulsions by use of chemical demulsifying agents, hereinafter often referred to simply as "chemicals." Many such demulsifying compounds are known in the art.

Generally speaking, the desalting process is divisible into three distinct operations, viz., (1) dispersion, (2) coalescence and (3) settling. The present invention involves a suitable correlation of these operations, with particular emphasis on improving the coalescing action, to the end that optimum desalting results or emulsion resolution will be obtained. It is an object of the invention to accomplish this and to provide a novel controllable coalescing action; a combination coalescing and settling process which produces superior desalting, dehydration, or emulsion resolution; a process in which the controlled coalescence is used in conjunction with a chemical demulsifying agent; and a process in which dehydration or desalting can be effectively and reliably obtained with simple equipment.

The dispersing step of the desalting process involves mixing a stream of the oil to be desalted and a stream of relatively fresh water, e. g., a water low in salt content relative to the salt content of the residual brine in the oil. The amount of the relatively fresh water is usually about 3% to 10% by volume of the oil. A small amount of a chemical demulsifying agent is mixed with the oil, the water, or the resulting emulsion. Additionally, heat may be applied to the streams of the oil, the water, or the emulsion. It is an object of the present invention to use a dispersing step well suited to the subsequent coalescing and settling steps.

The coalescing step provides an opportunity for contact between the dispersed droplets of the emulsion produced by the dispersing step, e. g., a coalescence of brine droplets and/or a coalescence of droplets of relatively fresh water and brine droplets of the "artificial" emulsion in such a way that contact is achieved without further subdividing the dispersed droplets and while inducing coalescence to a size to separate in the later settling step. As shown, for example, in the U. S. patent to Blair No. 2,252,959, it is conventional to utilize existing or specially fabricated pipe lines of suitable length and diameter to provide a degree of coalescing action, the emulsion stream flowing therethrough and the coalescing action being the result of turbulence induced by flow. Such a conduit-type coalescer leaves much to be desired. In the first place, it is open to the objection that it is usually designed for a particular oil and is not well suited to optimum operation on widely different oils which the refinery may be called upon to handle. In the second place, it is virtually impossible to maintain a uniform degree of turbulence in all portions of such a coalescing system. This arises from the fact that the turbulence in pipe L's, T's and other fittings is not the same as in the straight portions of the pipe, wherefore the turbulence varies from place to place and from time to time. In the third place, such a coalescing system permits no control of the coalescing action, other than through a change in flow that may be undesirable.

In general, the coalescing operation has not been given the attention it deserves as an important contributing factor to proper desalting or proper dehydration. Very little control of this operation has been attempted, the coalescence being left to chance and varying turbulence obtained in conduits. We have found that the degree and nature of the coalescing action are virtually determinative, other things being equal, of the efficiency of salt removal or dehydration. It is an important object of the present invention to use a controlled coalescing action in the resolution of emulsions in general and in the desalting of oils.

We have found that good control and uniform turbulence are best obtainable by the passage of the emulsion through an annular space between relatively moving surfaces. It is an object of the present invention to dehydrate and/or desalt emulsions by aid of a coalescing action induced by passage through an annular space between two bounding surfaces of revolution, with one surface moving relative to the other. It is a further object of the invention to employ such means for subjecting the emulsion to turbulence which induces optimum coalescence of the dispersed droplets preparatory to separating such coalesced droplets from the oil. In the desalting process, it is an object of the present invention to provide a method and apparatus for most effectively contacting the droplets of brine and relatively fresh water to give maximum salt removal and minimum water carry-over in the subsequent settling step.

The separation of the coalesced droplets or masses is conventionally effected in a settling zone provided by a horizontally-elongated tank or drum, as evidenced by the Blair patent supra. Here the emulsion enters a quiescent zone to permit the coalesced water masses to settle through the oil to a body of salty water in the lower section of the horizontal drum. The supernatant desalted oil is taken overhead to the still or to other refinery equipment either directly or with the aid of additional pressuring means. While such a horizontal drum can be used in the present process, we have found that the unexpected results are obtained when the coalescence of the invention is used in conjunction with a relatively deep settling vessel containing a body of separated water of substantial depth, the oil and its coalesced water masses being introduced near the bottom of such body of water and allowed to flow upwards therethrough into the superimposed oil layer. It is an object of the present invention to provide a combined coalescer and settler of this type; to provide a process employing combined coalescing and separating steps of the described types; and to provide a process and apparatus in which the emulsion passes from the coalescing zone to the settling zone with a minimum or negligible degree of turbulence, thereby avoiding redispersion.

Further objects and advantages of the invention will be apparent to those skilled in the art from the desalting and dehydration examples hereinafter presented, the invention residing in the new steps, combination of steps, elements and combinations thereof, hereinafter described or suggested.

Referring to the drawings:

Fig. 3 is a vertical cross-sectional view of the coalescer suggested in Fig. 1;

Figs. 4 and 5 are horizontal cross-sectional views taken, respectively, along the lines 4—4 and 5—5 of Fig. 3;

Figs. 6 and 7 are fragmentary vertical sectional views of alternative embodiments of a coalescer of the type of Fig. 3;

Fig. 8 is a vertical sectional view of a further alternative embodiment of the coalescer; and Fig. 9 is a horizontal cross-sectional view taken along the line 9—9 of Fig. 8.

Figure 1:
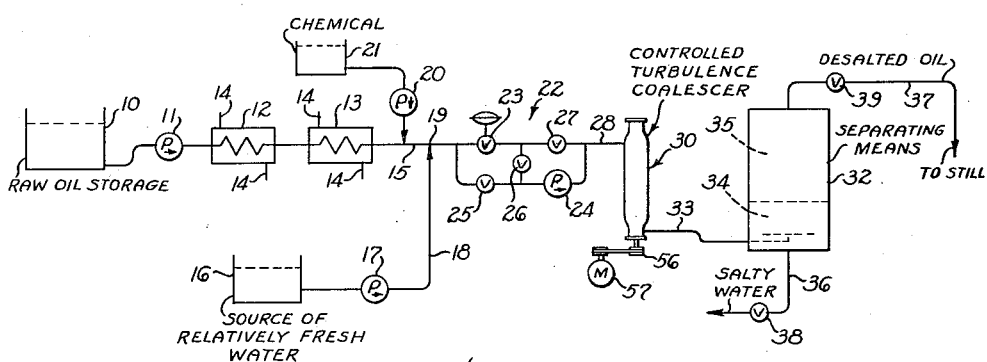
Fig. 1 is a simplified pipe-line diagram of one embodiment of the invention particularly adapted to the desalting of a pipe-line oil.

Referring particularly to Fig. 1, a stream of the pipeline oil or charging stock is pumped from a container 10 by a pump 11 and passed through heat exchangers 12 and 13 through which a heating medium is circulated by way of pipes 14 in a well-known manner to produce a heated stream moving along a conduit 15. A source of relatively fresh water, typically a container 16, is connected to a pump 17 which pumps a metered stream of this water through a pipe 18 into the pipe 15 at a junction 19. A metering pump 20, is used, pumps a small amount of a chemical demulsifying agent from a container 21 into the pipe 15 ahead of or beyond the heat exchangers, or ahead of or beyond the junction 19, the preferred point of introduction being ahead of this junction as shown.

The mixture of oil, chemical and water is then subjected to the mixing or dispersing action of a mixing means 22 exemplified as comprising a pneumatically-controlled emulsifying valve 23, adjustable to control the degree of mixing, and/or a pump 24 which can be used together or separately by the piping and valves shown, the pump 24 being typically of the centrifugal type. If the emulsifying valve 23 is to be used alone, valves 25 and 26 will be closed and valve 27 opened. If the pump 24 is to be used alone, valves 23 and 26 will be closed and valve 25 opened. If both devices are to be used serially, valves 25 and 27 will be closed and valve 26 opened.

The resulting emulsion flows through a pipe 28 to and through a later-described controlled turbulence coalescer 30 and then to a separating means 32 through a pipe 33. The coalescer-modified emulsion separates in the separating means 32 to form a body of salty water 34 and a body of desalted oil 35 which can be respectively withdrawn, continuously or intermittently, through pipes 36 and 37 under control of valves 38 and 39 therein. The desalted oil advances to the refinery equipment (typically to a still, not shown) through the pipe 37, either under the pressure in the separating means 32 or after repressuring.

The intensity of mixing provided by the mixing means 22 is of considerable importance, since this is one of the prime factors determining the degree of removal of the salt from the oil. If the mixing is comparatively mild, the subsequent settling is usually quite good but the percentage of salt removed is low because the settled water is largely the fresh water which was mildly mixed with the oil. If the mixing is more intense, the probability of contact of the fresh water with the brine particles in the salty oil is considerably increased, so that better salt removal is obtained provided the emulsion can be adequately separated. Highly intense mixing will militate against proper resolution of the emulsion, i. e., reduction of residual water content of the desalted oil to the small values, usually less than 0.6%, required by the refinery distillation operations. It is therefore, in general, desirable to operate with the greatest intensity of mixing possible while still achieving adequate sedimentation of water from the emulsion in the subsequent separation step. Because of the high efficiency of the contacting action of our process and apparatus, we are able to tolerate relatively severe emulsification of the fresh water with the oil while still obtaining acceptable carry-over values in the separation step. This characteristic of our system makes it possible to obtain much higher desalting efficiencies than was previously possible with the same settling conditions.

The effectiveness of the separation is determined by a number of factors, chief of which are the amount and kind of chemical demulsifying agent, if such is used; the character of the crude oil to be desalted; the temperatures of operation; the efficiency of the settling device used; and the effectiveness of the coalescing action employed to prepare the emulsion for the separation.

Extensive investigation has shown that a readily-controlled coalescing action producing optimum results in the process is best effected by flowing the emulsion through a space bounded by surfaces which are moving relative to each other, the coalescence being produced by turbulence induced by such relative movement as distinct from turbulence produced exclusively by flow. In the preferred practice of the invention, we flow the emulsion through an annular space bounded by concentric surfaces, one of which is rotated relative to the other at a suitable speed.

One embodiment of a device for practicing our procedure of controlled coalescence is shown in Fig. 3. It includes an outer member or cylinder 40 serving as a housing, being rigidly supported by a suitable framework, not shown. It is preferable, although not essential, to dispose the outer cylinder 40 in an upright position, in which event its upper end will be closed by a flanged pipe fitting 41 and a closing cover 42, the lower end of the cylindrical shell being closed by a flanged pipe fitting 43 and a closing cover 44.

An inner member or rotor, shown as an inner cylinder 45, is journalled to rotate coaxially with respect to the outer cylinder 40 so as to provide an annular space 46 bounded by an inner cylindrical surface 47 of the outer cylinder 40 and an outer cylindrical surface 48 of the inner cylinder 45.

The upper end of the inner cylinder 45 is journalled at 49 in an upper bearing member 50 depending from the closing cover 42. The lower end of the inner cylinder 45 carries a shaft 51 journalled in a bearing 52 of a centering member 53 providing openings 54, the lower end of the shaft 51 extending through a stuffing box 55 supported by the closing cover 44 and carrying a pulley 56 driven by a variable speed motor 57 (Fig. 1).

The entire emulsion stream is introduced into an entrance portion of the annular space 46 to move along this space and along and from an exit portion thereof. The flow may be in either longitudinal direction and may enter through a fitting 58 and discharge through a fitting 59, or vice versa. Fig. 1 shows the coalescer of Fig. 3 connected for downward flow, in which event the preformed emulsion is introduced endwise into an upper entrance portion 60 of the annular space and discharges from a lower exit portion 61 thereof. It is usually preferable that the emulsion flow substantially endwise into the annular space 46 rather than being introduced sidewise thereinto. With the structure shown, the use of a single stuffing box 55 makes possible operation at elevated pressure and temperature, without leakage. Since no appreciable sedimentation takes place during passage of the emulsion through the annular space 46 or in other portions of the controlled turbulence coalescer 30, it is immaterial whether the coalescer is mounted in a vertical, horizontal or inclined position.

The dimensions of the controlled turbulence coalescer 30 are not critical although, in general, it is preferred that the longitudinal length of the annular space 46 be at least several times its width measured between the surfaces 47 and 48. In the apparatus used to provide the data hereinafter presented as obtained from this equipment, the diameter of the outer cylindrical surface 48 of the inner cylinder 45 was 6½ inches and that of the inner cylindrical surface 47 of the outer cylinder 40 was 11 inches, the length of the annular space 46 being 72 inches.

In the embodiment of Fig. 3, the width of the annular space 46 and the turbulence induced therein by rotation of the inner cylinder 45 is substantially uniform from end to end. However, the invention is not limited to such uniformity of width or turbulence. For example, Fig. 6 suggests outer and inner members 64 and 65 of conical form providing a tapered annular space 66 therebetween. The relative tapers of the members 64 and 65 may be such that the width of the annular space 66 is substantially uniform or non-uniform, and one of the members may be cylindrical while the other is cone-shaped. Some embodiments of this type of equipment have certain advantages in that the width of the annular space 66 may be adjusted merely by changing the relative longitudinal positions of the members 64 and 65.

In other instances, either or both the outer and inner members may be of stepped configuration, the portions between the steps being cylinders or cones. Fig. 7 illustrates stepped outer and inner members 67 and 68 concentrically mounted to provide a stepped annular space 69 therebetween, the steps being exaggerated in size for purpose of clarity. The width of the stepped annular space 69 may be uniform or non-uniform in the successive zones thereof, thus forming a plurality of turbulence zones spaced by radial zones adjacent the steps. The transverse width of such radial zones will ordinarily be no less than that of the adjacent zones between the surfaces of revolution so as to avoid any redispersion between stages. However, should it be desirable to effect such redispersion between stages, the relative longitudinal position of the outer and inner members 67 and 68 may be changed to decrease the width of the radial zones.

When using the embodiments of Fig. 6 or 7, it is important to control the direction of flow of the emulsion so that the action in the exit portion of each annular space 66 or 69 is of the coalescing type hereinafter discussed.

Another embodiment of the controlled turbulence coalescer is illustrated diagrammatically in Figs. 8 and 9. While this embodiment provides the same process features of flow of the emulsion through an annular space between surfaces of revolution, one of which is rotating, it further embodies additional features from the standpoint of mechanical construction and adaptability for changing the flow conditions in the annular space. The structure of this embodiment is not per se a part of the present invention but is claimed, with modifications, in the copending application of Logan C. Waterman, Serial No. 363,349, filed June 22, 1953.

In this embodiment, a housing 70 is preferably mounted in a vertical position and provides upper and lower flanges 71 at its ends. A closing cover 72 is attached to the upper flange 71 and carries a depending member 73 which supports a stationary closed-top outer cylinder 75 having an inner cylindrical surface 76 serving as the outer boundary of an annular space 77 through which the emulsion passes on its way through the coalescer. The inner, rotating, boundary of the annular space 77 is formed by an external surface 78 of an inner rotor or cylinder 79 which is open at its top and closed at its bottom by a wall 80.

Secured to the wall 80 in driving relationship is an inner tubular member 81 connected by a spider 82 with a shaft 83, the tubular member 81 having a tapered upper end 84 opening into the interior of the inner cylinder 79 to discharge thereinto emulsion entering an inlet fitting 85, this emulsion flowing externally of the shaft 83, passing through the spider 82 and rising internally of the tubular member 81. The shaft 83 passes through a stuffing box 86 of the inlet fitting 85 and carries a pulley 88 which is rotated by any suitable driving means.

The inner tubular member 81 is journalled in upper and lower bearing means 90 and 91 supported by an outer tubular member 92 joined to the fitting 85 and to an outlet fitting 93. This outlet fitting is attached to a conduit 94 open at its upper end and secured to a closing cover 95 attached to the lower flange 71. Between the conduit 94 and the outer tubular member 92 is a passage 96 receiving the emulsion stream which has been subjected to the coalescing action in the annular space 77, this stream discharging through the outlet fitting 93.

The housing 70 of this type of coalescer is initially filled with oil or emulsion. The stream of the emulsion to be treated rises through the tubular member 81 and flows upwardly through the rotating inner cylinder 79 and thence downwardly through the annular space 77 where the coalescing action is effected. The treated stream discharges downwardly through the passage 96 and from the outlet fitting 93. In this embodiment, as before, it is within the scope of the invention to use tapered or stepped inner and outer members bounding the annular space 77 but the turbulence in at least the exit portion of such space, represented in Fig. 8 by the numeral 97, should be of a coalescing nature and of the character to be described. Typical dimensions of an exemplary embodiment of this invention, used in obtaining the data hereinafter presented as obtained from this equipment, are as follows: Diameter of the housing 70, 30"; internal diameter of the closed-top outer cylinder 75, 18"; external diameter of the closed-bottom inner rotating cylinder 79, 14"; width of the annular space 77, 2"; length of this annular space, 39".

The embodiment of Fig. 8 is quite flexible in operation since the turbulence in the annular space 77 may be varied both by the speed of rotation of the shaft 83 as well as by the diameters of the closed-top outer cylinder 75 and the open-top inner rotating cylinder 79, which are easily replaceable to permit employing cylinders of different diameter. Other advantages of this embodiment are mentioned in the application supra.

The coalescing action in the annular space of any of the embodiments illustrated is the result of turbulence induced by relative rotation of the bounding surfaces as distinct from turbulence induced merely by forward flow of the emulsion therethrough. Thus, the degree of turbulence is readily controllable, and we have found that the degree of turbulence is important in controlling the coalescence of the dispersed droplets of the emulsion. In accordance with the present invention, the turbulence should be such as to bring these droplets into repeated contact with each other. In addition, this contact should result in coalescence of the droplets to increase the average particle size of the emulsion and preferably to produce coalesced masses of such size as to separate by gravity from the emulsion when introduced into the quiescent zone of the separating means 32.

With some emulsions, the droplets are sufficiently unstable to coalesce with each other upon contact, even in the absence of an added chemical demulsifying agent. However, with emulsions in which the dispersed droplets are more stable, it is desirable that a small amount of a chemical demulsifying agent be present in the annular space. This is particularly true as concerns emulsions in which the dispersed phase is finely divided, since it is known that the smaller the particle size the greater the stability of the emulsion. The chemical demulsifying agent serves to destabilize the particles or droplets so that the probability of coalescence upon contact, as provided by the controlled turbulence coalescer, is much greater than without the chemical.

Various chemical demulsifying agents differ in their ability to decrease the stability of oil-continuous emulsions, as is known in the art. Among those most effective in the treatment of crude oil emulsions are agents of the type described in U. S. Patents Nos. 2,154,423; 2,498,656, and 2,499,360. However, the invention is not limited to the particular type of chemical demulsifying agent. In general, demulsifying chemicals currently used in the art of chemical dehydration and desalting operations are well suited for use in our process.

Unexpectedly, we have found that the ratio of chemical demulsifying agent to oil required for satisfactory operation of our process is normally much less than in conventional dehydrating or desalting processes. In the present process, we have found that volumetric ratios of between 1:20,000 and 1:200,000 are adequate, most oils being satisfactorily treated at ratios between 1:30,000 and 1:50,000. When we have operated with chemical ratios greater than about 1:200,000, we have found that the resulting curves, plotted in the manner of those in Fig. 2 (to be described) are quite flat and do not tend to show as pronounced minima as when smaller chemical ratios are used.

In at least the exit portion of the annular space, the rotor-induced turbulence should not be so high as to subdivide the droplets. Rather, this turbulence should be so controlled as to induce a maximum degree of coalescence if optimum results are to be obtained. It has in the past been presumed that the most determinative factor in the coalescing mechanism involved in emulsion resolution is the amount of turbulence in the system as measured by the Reynolds number. As applied to rotating coalescers of the type herein described, we have found that Reynolds numbers do not correctly express the desired coalescence-inducing turbulence, in accordance with established formulae for calculation of such Reynolds numbers.

Instead, best coalescence has been found to exist, with spacings of the surfaces of revolution up to about 6 inches, if the turbulence is such as to satisfy the equation:

$$L = v^{2/3} R T$$

where L is a measure of the turbulence, known as the Lehmann number, and has a value between about 20 and 50, often within the more limited range of about 30 to 40; $v$ is the viscosity of the oil expressed in poises; R is the radius in cms. of the inner rotating surface bounding the annular space; and T is the angular rotation rate of the inner rotating surface in radians per second. Large numbers of tests on different emulsions have demonstrated the desirability of this degree of turbulence in at least the exit portion of the annular space. In spite of large variations in apparatus dimensions, characteristics of the oil, etc., we have found that the Lehmann numbers are remarkably uniform for optimum coalescence and therefore are considered to reflect the stresses in the fluid systems which account for the contacting and coalescing mechanism previously described. This is particularly true with widths of the annular space in the commercially practical range of about 1 inch up to about 6 inches. With smaller-throughput equipment, spacings smaller than 1 inch can be used.

If the concentration of dispersed droplets in the emulsion is unduly low, there will be less probability of contact and coalescence. For example, the concentration of brine droplets in a salty crude oil which has already been dehydrated to pipe-line requirements or to produce a refinery charging stock is so low, and the droplets are so small, that it is not commercially feasible to provide the conditions for directly coalescing these widely spaced droplets into masses of a size to settle from the oil and thus effect a desalting of the oil. Correspondingly, it is desirable for this and other reasons to emulsify relatively fresh water into the oil in amounts of about 5% by volume or within the range of about 3–10%. This water must be sufficiently subdivided so that there exists the probability of adequate contact between the brine droplets and the droplets of relatively fresh water to permit coalescence with each other and growth to such size that separation may be obtained. If the water is only very loosely dispersed, as by forming very coarse droplets, this water will separate readily from the emulsion but will remove very little salt. If the relatively fresh water is extremely finely divided, the emulsion may be too stable to separate by economical means. It is therefore evident that for the purpose of contacting the fresh water and brine droplets, the highest dispersion of the fresh water is desirable, while for settling purposes the particles should be as large as possible to obtain the lowest carry-over from the settling means. Fortunately, it is relatively easy by the equipment shown to prepare emulsions in the desalting process which are excellently suited to the coalescing action of the invention.

We have found that much superior results are obtained by introducing a controlled coalescence into the desalting operation. By so doing, it has been possible to increase the pressure drop permissible in the emulsifying equipment, thereby greatly increasing the contact of brine and fresh water droplets to promote improved salt removal. In addition, this is accomplished in the present invention without increasing the amount of residual water carried over in the settling operation and appearing in the desalted oil. This is of great importance to refiners in general, because even small salt contents in the charging stocks are now recognized as having serious adverse effects on the refining equipment and the quality of the products. We have also found that our process is particularly advantageous when chemical demulsifying agents are used in the desalting process.

Figure 2:
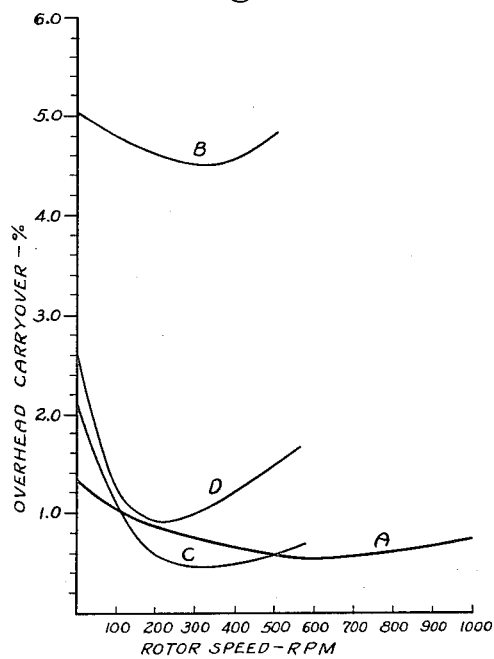
Fig. 2 is a graphical representation of the results of runs showing the unexpected efficacy of the invention.

Some of the results of dehydration operations with coalescers of the type shown in Figs. 3 and 8 are shown graphically in Fig. 2. Referring thereto, curve A shows the results of operation on a Mid-Continent crude having a residual brine content of about 0.2% and a salt content of about 54 P. T. B (pounds per thousand barrels of oil). The oil was heated to about 210° F. and about 5% by volume of fresh water was injected into the oil stream, to which had previously been added a chemical demulsifying agent in a ratio of 1:20,000, this agent being of the type hereinbefore mentioned. The oil-water mixture was then emulsified by passage through an emulsifying valve which imposed a pressure drop of 40 p. s. i. (pounds per square inch) on the stream at a throughput rate of 2,000 B. P. D. (barrels per day). The resulting emulsion was then passed through the controlled turbulence coalescer of Fig. 3, the rotation rate being set at various speeds to determine its effect on the residual water content of the treated oil. These rotation rates are plotted as abscissa in Fig. 2 against overhead carry-over or residual water content, plotted as ordinates. The various rates were held constant for a sufficient length of time to establish equilibrium conditions, and samples were then taken from the effluent oil stream and allowed to settle for 20 minutes, after which the water content of the upper portion of the sample was determined by the centrifuge method of A. S. T. M., Method D–96–46. This represents the residual water carry-over of the desalted oil and is of the magnitude to be expected from the usual settling operations practiced in a refinery. Special care was taken to maintain isothermal settling conditions in order to obtain accurate and reproducible results. It will be observed that optimum coalescence and optimum desalting results occurred in this run at about 600 R. P. M.

In the run for which the results have been plotted as curve B in Fig. 2, no chemical demulsifying agent was added to the system. The crude was a Mid-Continent crude and the operating conditions were similar to those described above, except that the apparatus of Fig. 8 was used. In this case, it will be seen that the carry-over was extremely high, there being very little settling of the dispersed water from the oil, although there was some decrease in the carry-over values as the rotational rate was increased to approximately 330 R. P. M. The marked beneficial effect of chemical demulsifying agents is clearly evident from a comparison of curves A and B on this type of oil. However, on certain other oils, particularly those which are relatively easy to treat, it is often unnecessary to add any chemical demulsifying agent to the system, adequate dehydration and desalting still being obtainable in such cases by the use of our coalescing system.

Curve C of Fig. 5 represents the results of another run made with apparatus of the type shown in Fig. 8, the general operating conditions being similar to those previously described except that the through-put rate was 1,000 B. P. D. and the ratio of chemical demulsifying agent to oil was 1:30,000. In this run, it is clearly evident that rotation of the coalescer rotor has a markedly beneficial result on the amount of residual water left in the treated oil, the optimum rotation rate being about 330 R. P. M.

Curve D of Fig. 2 was obtained from a run on Wyoming crude under operating conditions similar to those previously described, the throughput rate being 1,000 B. P. D. and the chemical demulsifying agent being added at a ratio of 1:30,000. Apparatus of the type shown in Fig. 8 was used and the optimum rotation rate was determined to be about 220 R. P. M.

Curves A to D show the benefits of rotation at optimum rates. They show also that any rotation, within the practical limits employed in the tests, is beneficial as compared to no rotation at all.

In order to determine more clearly the effects of variations in the crude oils used and the type of apparatus employed, numerous other runs were made on other oils and with varying types of coalescers. Some of the results of such tests are shown in the following table, in which the critical dimensions of the rotating coalescer equipment are shown, along with the sources of the crude oil and some of the properties thereof which appear to be critical. Curves for the values of water carry-over at various rotation rates were plotted and the optimum values selected for each set of runs, being shown in the table under the heading "Optimum R. P. M." The results are as follows:

| Coalescer Used | Oil Source | Oil Density (g./ml.) | Oil Viscosity (poises) | Emul. Temp. (° F.) | Rotor Radius (cm.) | Stator Radius (cm.) | Gap (cm.) | Optimum R. P. M. | Reynolds Number | Lehmann Number |
|---|---|---|---|---|---|---|---|---|---|---|
| A | Hawkins | .851 | .051 | 200 | 8.38 | 15.22 | 6.86 | 300 | 55,000 | 36 |
| B | do | .851 | .051 | 200 | 5.08 | 7.62 | 2.54 | 500 | 16,900 | 37 |
| B | Healdton | .780 | .0148 | 200 | 5.08 | 7.62 | 2.54 | 1,250 | 134,000 | 40 |
| Fig. 8 | Mid.-Cont | .804 | .0148 | 210 | 17.8 | 22.83 | 5.08 | 310 | 205,000 | 35 |
| Fig. 3 | do | .804 | .0148 | 210 | 8.38 | 13.97 | 5.59 | 600 | 266,000 | 32 |
| Fig. 8 | West Texas | .811 | .0130 | 210 | 17.8 | 22.83 | 5.08 | 330 | 250,000 | 34 |
| Fig. 8 | Wyoming | .844 | .0287 | 210 | 17.8 | 22.83 | 5.08 | 220 | 78,500 | 38 |

From the above table it is quite apparent that no particular rotation rate is suitable for best results under all of these operating conditions. The Reynolds numbers for the various conditions in the runs shown in the table were computed, and the results show that this number does not provide any reasonably good correlation between the variables involved in the various tests. On the other hand, the calculated Lehmann numbers for best operation fall in the relatively narrow range of about 30 to 40, and other test results not shown indicate that the most desirable values for the Lehmann number are predominantly within the range of 20 to 50.

The desirable growth of the particle size in the annular space bounded by the relatively rotating surfaces of revolution would be defeated by the presence of such turbulence as would disperse or redisperse the dispersed droplets issuing from the annular space. Such redispersion is likewise to be avoided during the time that the emulsion is transferred from the exit portion of the annular space to the settling means 32. In this connection, it is desirable that there be a minimum of turbulence during passage from the controlled turbulence coalescer through the pipe 33 and into the settling means 32; otherwise, the beneficial effect of the coalescing action will be to some degree lost. This is illustrated by results obtained from a run in which the emulsion from the coalescer was passed directly, i. e., with relatively short and direct pipe connections, to a settling vessel. The residual water content of the settled oil was 0.45%. However when the emulsion after leaving the coalescer was passed through thirteen elbows, a 2″ orifice and a number of feet of pipe, the settled oil had a water content of 0.7% indicating that considerable redispersion of coalesced water had occurred.

While the runs hereinbefore mentioned represent results that can be obtained merely by passage of the coalescer-treated emulsion into an ordinary settling vessel, unexpectedly superior results can usually be obtained if the controlled turbulence coalescers of the invention are used in conjunction with a settling tank in which the emulsion is injected into the bottom of the tank and allowed to flow upwards through a water layer into a superimposed oil layer. For example, a refinery was processing a Mid-Continent crude oil stream containing about 60 P. T. B. salt by adding a chemical reagent at a ratio of 1:43,000, then adding about 5% of fresh water and emulsifying the mixture by means of a valve. The emulsion thus formed was passed through various heat exchangers and pipe lines to a conventional desalting drum which separated the emulsion so that the overhead oil had a water content of 0.30% and a salt content of 8.9 P. T. B. When this emulsion was diverted to our rotating coalescer equipment and subjected to a higher pressure drop across an emulsifying valve before being passed through the coalescer of Fig. 3 with the rotor operating at 692 R. P. M., the resulting oil when allowed to settle quietly for 20 minutes still retained about 3.4% water, being higher than in the conventional equipment because of the additional mixing employed. However, when the stream was passed directly from the coalescer to a vertical cylinder and allowed to bubble through a water layer in the lower portion of the cylinder, the separated effluent oil carried only 0.18% water and only 2.7 P. T. B. of salt. This shows a considerably greater salt removal effectiveness by the use of our procedure as compared with results obtainable by conventional practice.

While many of the exemplified test results have been set forth as concerns a desalting operation, involving artificially formed emulsions, our process and apparatus also gives unexpected results when employed to resolve naturally occurring emulsions, as for example in the dehydration of crude oil emulsions as produced from the ground. The water content of such emulsions is usually such that no additional water need be emulsified therein to secure effective resolution, the emulsions being pumped directly to the pipe 28 of Fig. 1 after heating and with or without the injection of a chemical demulsifying agent, depending upon whether such agent is needed to destabilize the interfaces. The controlled turbulence coalescer 30 will cause contact and coalescence of the dispersed water droplets, leading to efficient separation of the water when introduced into the separating means 32.

Various changes and modifications can be made without departing from the spirit of the invention as herein described.

We claim as our invention:

1. A process for treating a dispersion comprising an external phase of oil and an internal phase present as droplets dispersed in the oil, which process includes the steps of: flowing the dispersion through an annular space between surfaces of revolution which are rotating relative to each other to provide a controllable turbulence in said annular space, said turbulence causing repeated contact between said droplets; controlling the relative rotation of said surfaces to induce coalescence of said droplets due to said repeated contact, thus increasing the particle size of the droplets constituting the internal phase material and producing a treated dispersion; delivering the treated dispersion to a zone removed from said annular space while containing substantially all the internal phase material present in the dispersion to be treated; and separating the coalesced internal phase material from said oil in such zone.

2. A process as defined in claim 1 in which the relatively rotating surfaces are an inner rotating surface and an outer stationary surface concentric with each other, the annular space therebetween providing an entrance portion adjacent one end thereof which receives said dispersion, said annular space providing an exit portion adjacent the other end of said annular space and from which the dispersion flows preparatory to said separating step, the spacing of said surfaces bounding said exit portion being no more than about 6 inches and the turbulence in said exit portion being such as to satisfy the equation:

$$L = v^{2/3} R T$$

where $L$, the Lehmann number and a measure of the turbulence in said exit portion, is between about 20 and 50, $v$ is the viscosity of the oil expressed in poises, $R$ is the radius in cms. of the inner rotating surface bounding said exit portion, and $T$ is the angular rotation rate of said inner rotating surface in radians per second.

3. A process as defined in claim 1 in which the relatively rotating surfaces are an inner rotating cylindrical surface and an outer stationary cylindrical surface, said surfaces being concentric with each other and being spaced so that all portions of the annular space therebetween have a width not more than about 6 inches, the turbulence in said annular space being such as to satisfy the equation:

$$L = v^{2/3} R T$$

where $L$, the Lehmann number and a measure of the turbulence in said annular space, is between about 20 and 50, $v$ is the viscosity of the oil expressed in poises, $R$ is the radius in cms. of the inner rotating surface bounding said exit portion, and T is the angular rotation rate of said inner rotating surface in radians per second.

4. A process as defined in claim 1 in which a chemical demulsifying agent is present in the dispersion in said annular space in a chemical : oil volumetric ratio no greater than about 1:20,000.

5. A process as defined in claim 1 in which said separating step is performed in a quiescent zone containing a body of said internal phase material in its lower end and a body of separated oil above such body of internal phase material, a stream of the dispersion issuing from said annular space being discharged into said body of internal phase material so that the oil of said stream rises therethrough before reaching said body of treated oil.

6. A process as defined in claim 1 in which said separating step includes gravitationally separating the internal phase material from the oil in a quiescent zone, and in which a stream of the oil containing said increased particle size droplets is flowed from an exit portion of said annular space to said quiescent zone while being subjected to a turbulence no higher than that present in said exit portion, thereby preventing substantial redispersion of said internal phase material during transit to said quiescent zone.

7. A process for treating an oil to remove therefrom a material capable of associating with a liquid sufficiently immiscible with the oil to produce an internal phase when mixed therewith, which process includes the steps of: mixing streams of said liquid and said oil to produce an oil-continuous emulsion comprising small liquid droplets dispersed in said oil; subjecting the resulting emulsion to a controllable turbulence in an annular space between surfaces of revolution which are rotating relative to each other, said annular space providing an entrance portion into which a stream of the resulting emulsion is moved to flow along said annular space and along and from an exit portion of said space all to the substantial exclusion of physical separation of said liquid droplets from the oil, said turbulence causing repeated contact between said liquid droplets; controlling the relative rotation of said surfaces to induce coalescence of said liquid droplets into oil-dispersed coalesced masses of sufficient size to gravitate from the oil; and introducing the thus-treated emulsion into a quiescent zone and there settling the coalesced masses from the oil.

8. A process for treating petroleum emulsions containing small amounts of dispersed brine particles, which process includes the steps of: mixing with said emulsion a chemical demulsifying agent and relatively fresh water to produce an emulsion; flowing a stream of this emulsion into, along and from an annular space between concentric surfaces of revolution which are rotating relative to each other to provide a controllable turbulence in said annular space, said turbulence causing repeated contact between brine particles and particles of relatively fresh water; controlling the relative rotation of said surfaces to induce coalescence of such particles into oil-dispersed coalesced masses of sufficient size to gravitate from the oil thus producing a stream of a treated dispersion; delivering said stream of treated dispersion to a zone spaced from said annular space before any substantial portion of said coalesced masses has separated from the oil; and separating said oil-dispersed coalesced masses from the oil in said zone.

9. A process as defined in claim 8 in which the ratio of the volume of the chemical demulsifying agent to that of the oil is no greater than about 1:20,000.

10. A process as defined in claim 8 in which said annular space provides an exit portion through which said emulsion flows when leaving said annular space, the average width of said exit portion of said annular space being between about 1 inch and about 6 inches, the turbulence in said exit portion being such as to satisfy the equation:

$$L = v^{2/3}RT$$

where L, the Lehmann number and a measure of the turbulence in said exit portion, is between about 20 and 50, $v$ is the viscosity of the oil expressed in poises, R is the radius in cms. of the inner rotating surface bounding said exit portion, and T is the angular rotation rate of said inner rotating surface in radians per second.

11. In a crude oil desalting process in which a salty crude oil is mixed with water to form an oil-continuous emulsion which is subsequently subjected to a settling step to remove a salty aqueous phase from the oil phase and thus produce a desalted oil, the improvement comprising passing a stream of the oil-continuous emulsion into and through an annular space bounded by inner and outer concentric surfaces of revolution, the downstream end portion of said annular space being an exit portion having a mean width between about 1 inch and about 6 inches, and rotating one of said surfaces of revolution relative to the other to establish a coalescing turbulence in said exit portion measured by a Lehmann number therein between about 20 and 50, said turbulence producing coalesced oil-dispersed masses which are settled from the oil substantially exclusively in the subsequent settling step.

12. A process as defined in claim 11 in which said surfaces of revolution are cylinders and in which the length of said annular space is at least several times its width.

References Cited in the file of this patent

UNITED STATES PATENTS

| Number | Name | Date |
|---|---|---|
| 1,747,155 | Birdsall | Feb. 18, 1930 |
| 2,210,782 | Stevens | Aug. 6, 1940 |
| 2,252,959 | Blair | Aug. 19, 1941 |